United States Patent [19]

Koons

[11] 4,133,352
[45] Jan. 9, 1979

[54] PIPE COATING COMPOSITIONS

[75] Inventor: Russell E. Koons, El Dorado, Ark.

[73] Assignee: Lion Oil Company, Los Angeles, Calif.

[21] Appl. No.: 844,287

[22] Filed: Oct. 21, 1977

Related U.S. Application Data

[63] Continuation of Ser. No. 633,125, Nov. 18, 1975, abandoned.

[51] Int. Cl.$^2$ .................. F16L 9/02; C08L 15/02; B05D 1/36; B32B 15/04
[52] U.S. Cl. .................... 138/146; 138/145; 138/139; 106/273 R; 106/278; 260/3.5; 260/890; 427/402; 428/36; 428/468; 428/489
[58] Field of Search .......... 138/139, 145, 146; 208/22, 23, 44; 106/273 R, 278; 428/36, 468, 489; 260/3.5, 890; 427/402

[56] References Cited

U.S. PATENT DOCUMENTS

| 2,436,332 | 2/1948 | Rollhaus | 260/28.5 B |
|---|---|---|---|
| 2,648,644 | 8/1953 | McMillan et al. | 260/28.5 B |
| 2,685,523 | 8/1954 | Cross, Jr. et al. | 106/278 R |
| 2,734,882 | 2/1956 | Kirsch | 260/28.5 AS |
| 2,752,267 | 6/1956 | Shideler | 428/465 |
| 2,918,940 | 12/1959 | Carr | 138/145 |
| 3,010,926 | 11/1961 | Odasz, Jr. et al. | 260/28.5 B |
| 3,318,801 | 5/1967 | Alexander et al. | 106/284 |
| 3,331,789 | 7/1967 | Clark | 260/28.5 B |
| 3,347,950 | 10/1967 | Mazurk | 260/28.5 B |
| 3,878,087 | 4/1975 | Kawai et al. | 106/273 R |

Primary Examiner—William R. Dixon, Jr.
Attorney, Agent, or Firm—Poms, Smith, Lande & Glenny

[57] ABSTRACT

A composition especially useful as a primer coating having improved hot line adhesion and cathodic disbonding resistance comprises a solution of chlorinated rubber and aromatic petroleum pitch in a solvent.

26 Claims, No Drawings

PIPE COATING COMPOSITIONS

This is a continuation, of application Ser. No. 633,125, filed Nov. 18, 1975 now abandoned.

BACKGROUND OF THE INVENTION

All major pipelines are protected by cathodic protection, which has been very successful in markedly decreasing failures due to corrosion. During pipe coating applications, some breaks or imperfections in the coating will occur, so the imposed negative charge on the pipelines protects these areas where "holidays" exist in the coating or where holidays develop later. Unfortunately, with the aid of moisture and mineral matter in the soil, the negative charge increases undercutting and disbonding of the coating system at the holidays at a faster rate than would occur if the charge were not present. Loose coating increases the electical power requirements on a pipeline and in badly damaged areas even corrosion may result due to the difficulty of maintaining the proper charge on all areas of the pipe.

A primer for asphaltic pipe coatings can serve at least three important functions:

1. It can provide better adhesion between the hot applied pipe coating and the cooler pipe during application.
2. It can prevent tiny voids under the pipe coating by filling in pits and irregularities in the rough steel surfaces that the molten coating may not fill.
3. It can provide a different degree of physical and chemical protection than is available by the pipe coating alone. Such factors as cathodic disbonding resistance and impact resistance, for example, are often greatly influenced by the primer used on the pipe.

However, the presently available primers, including the chlorinated rubber base primers, have not proved to be completely satisfactory.

SUMMARY AND DESCRIPTION OF THE BROAD EMBODIMENTS

It is therefore an object of this invention to provide a composition especially useful as a primer coating for asphalt-based coatings which will improve the properties of such asphalt-based coatings, particularly their hot line adhesion to substrates especially metal substrates and cathodic disbonding resistance, as well as mechanical bond strength, cold crack resistance and impact resistance.

This invention provides a composition of matter especially useful as a primer for asphalt-based finish coatings. This new composition improves the properties of asphalt-based coatings applied over such compositions. The new composition comprises a solution of chlorinated rubber and aromatic petroleum pitch in a solvent. Preferably, this solution also comprises a storage stabilizer for the chlorinated rubber. The weight ratio of chlorinated rubber to aromatic petroleum pitch must be at least about 0.8:1, and may be as high as 15:1 or even higher, depending upon the asphalt finish coating that may be applied over the compositions of this invention.

This invention also provides substrates, such as metal substrates, coated at least partially with at least one composition of this invention. In particular, the compositions of this invention may be applied to metal surfaces as prime coatings which, where overcoated with asphalt-based finish coatings of many different kinds, tend to resist cathodic disbonding and have good, sometimes excellent, physical properties.

The chlorinated rubber used in the compositions of this invention may be any of the rubbers of this kind commercially available. The Hercules Company, for example, sells chlorinated rubber under the trade name "Parlon". Where Parlon is the chlorinated rubber, we prefer that the Parlon rubber have a viscosity of about 20 to about 300 centipoises where the viscosity is measured at 25° C. using a 20% solution of the rubber in toluene. Typically, the chlorinated rubber constitutes about 8% to about 35%, preferably about 8% to about 20%, and more preferably about 13%, by weight of the compositions of this invention.

Aromatic petroleum pitch is an unusual residual material that bears little resemblance to those refinery products usually referred to as pitch. It is unlike asphalt and is not generally even compatible with asphalt. Its components are almost completely aromatic—a great mixture of alkylbenzenes, alkylnaphthalenes, alkylindenes, and alkylindanes, phenanthrene and alkylanthracenes and higher condensed ring systems. Generally, aromatic petroleum pitch may be obtained by submitting crude petroleum oil, heavy oil, naphtha, asphalt, or any combination of these materials to heat cracking at 700° C. or higher temperature and then distilling off the fractions of 400° C. and less from the cracked residual mixture of tar and pitch. See U.S. Pat. Nos. 3,714,282 and 3,318,801 for more details. The preferred aromatic petroleum pitch for the compositions of this invention is a material sold under the trade name Resin PR by Monsanto Polymers and Petrochemicals Company. Typical analysis of this material is as follows:

| PROPERTIES | TYPICAL ANALYSIS |
|---|---|
| Ring and Ball Softening Point, ° F. | 100–150 |
| Conradson Carbon, wt. % | 32–38 |
| Pentane Insolubles, wt. % | 30–38 |
| Benzene Insolubles, wt. % | 1.0 |
| Flash Point, ° F. | 220° F. Min |
| Pour Point, ° F. | 170–200 |
| Ash, wt. % | .01–.03 |
| Specific Gravity at 77/77° F. | 1.16–1.20 |
| API Gravity | −12.4 |
| Carbon, wt. % | 93.0 |
| Hydrogen, wt. % | 6.5 |
| Nitrogen, wt. % | .3 |
| Sulfur, wt. % | .05–.20 |
| Saybolt Furol Viscosity, sec | |
| at 280° F. | 20–120 |
| at 250° F. | 80–220 |

Aromatic petroleum pitch generally constitutes about 2% to about 25%, and preferably about 4 to about 25% by weight of the compositions of this invention.

Suitable solvents for the compositions of this invention are those capable of dissolving both chlorinated rubber and aromatic petroleum pitch. Preferably, the solvent is one or more aromatic solvents such as xylene, toluene, and aromatic naphthas having a boiling range of about 311° F. to about 344° F. such as Enco-100 and SC-100, both sold by Missouri Solvent and Chemical Company. Generally, solvent constitutes about 40 to about 90, preferably about 55 to about 88, and more preferably about 74 percent by weight of the compositions of this invention.

To protect the chlorinated rubber against deterioration, we prefer that the primer further contain about 0.3% to about 0.8% and preferably about 0.5% by weight of a storage stabilizer for the rubber. Preferably, the stabilizer is epichlorohydrin but other suitable stabilizers are available.

The compositions of this invention may be prepared by forming a first solution of chlorinated rubber in solvent, a second solution of aromatic petroleum pitch in solvent, and then mixing the two solutions together. Where used, storage stabilizer is added to the resulting solution.

The compositions of this invention are particularly useful as coatings, especially primer coatings. Primer coatings are commonly applied to metal substrates that are to be coated with asphalt-based compositions. Thus, metal substrates made of steel or aluminum such as tanks and pipes may be coated, at least partially, with the compositions of this invention, and then with one or more asphalt-based finish coatings.

SUMMARY OF THE PREFERRED EMBODIMENTS

It is, therefore, an object of the present invention to provide a compatible primer for an asphaltic based pipe coating which will improve the properties of pipe coating, particularly its hotline adhesion and cathodic disbonding resistance, as well as mechanical bond strength, cold crack resistance and impact resistance.

In accordance with the present invention, there is provided a compatible primer for so improving the properties of an asphaltic pipe coating which comprises a solution of substantially equal weight amounts of a chlorinated rubber and an aromatic petroleum pitch dissolved in an aromatic solvent and preferably containing a storage stabilizer for the chlorinated rubber.

DESCRIPTION OF THE PREFERRED EMBODIMENTS

The primer of the present invention comprises a solution of (a) from about 8% to about 35%, and preferably about 13%, by weight of a chlorinated rubber, a 20% solution of the chlorinated rubber in toluene having a viscosity of from about 20 to about 300, preferably about 300, centipoises at 25° C., such as Parlon S-20 to Parlon S-300, of Hercules, Inc., or Alloprene of I.C.I., America, Inc.; (b) from about 4% to about 25%, and preferably about 13%, by weight of an aromatic petroleum pitch having a softening point of from about 104° F. to about 152° F., preferably from about 115° F. to about 135° F., and a specific gravity at 60° F. of about 1.17, such as Resin PR of Monsanto Company; and (c) from about 55% to about 88%, and preferably about 74%, by weight of an aromatic solvent for the chlorinated rubber and the aromatic petroleum pitch; the weight ratio of component (a) to component (b) being from about 0.8:1 to about 2:1 and preferably about 1:1. Suitable aromatic solvents include xylene and an aromatic naphtha solvent having a boiling range of from about 311° F. to about 344° F., such as Enco-100 and SC-100 of Mo. Solvent and Chemical Company.

In order to protect the chlorinated rubber agent against deterioration, it is also preferred that the primer further contain (d) from about 0.3% to about 0.8% and preferably about 0.5%, by weight of a storage stabilizer for the chlorinated rubber. Epichlorohydrin is the preferred stabilizer, although other suitable storage stabilizers for chlorinated rubber solutions could also be used.

The preferred primer is further characterized by the following properties: a flash point (Tag Closed Cup) of greater than 75° F., and typically 82° F.; a viscosity (Brookfield at 77° F.) of 165-235 centipoises and typically 200 centipoises; and a solids content (approximately 1.5 grams, 20 minutes at 325° F.) of 24-27 and typically 25.5.

As a general rule, the mechanical bond strength of asphaltic pipe coatings using a primer of the invention is more improved when the primer contains a lower viscosity grade of the chlorinated rubber. As a further general rule in an asphaltic coated pipe using a primer of the invention, as the weight ratio of chlorinated rubber to aromatic petroleum pitch in the primer is increased, the cathodic disbonding resistance increases but the mechanical bond strength decreases and as the weight ratio of chlorinated rubber to aromatic petroleum pitch in the primer is decreased, the mechanical bond strength increases but the cathodic disbonding resistance decreases. Also as a general rule the higher the viscosity grade of the chlorinated rubber present in the primer of the invention, the greater the cathodic disbonding resistance of a primed asphaltic coated pipe.

The primer can be prepared by forming a first solution of the chlorinated rubber in the aromatic solvent, forming a second solution of the aromatic petroleum pitch in the aromatic solvent and then mixing the two solutions together, the storage stabilizer, when used, being added to the mixed solutions.

Thus, to prepare 700 gallons weighing 5,635 lbs. of the preferred primer, 3,284 lbs. of aromatic solvent (xylene) are added to a mixing tank and heated to 100° F.–110° F. Then 721 lbs. of the chlorinated rubber (Parlon S-300) are added very slowly as the aromatic solvent is agitated. The chlorinated rubber powder forms a gel around each particle as it dissolves and it tends to form gelatinous lumps which are slow to dissolve if the addition of the chlorinated rubber powder is too rapid. After about an hour of mixing, the agitator is stopped and the solution examined for any undissolved material. Agitation is continued, if necessary, to get all of the chlorinated rubber solids into solution. The resulting 18% by weight solution of the chlorinated rubber in the aromatic solvent (xylene) weighing 4,005 lbs. has the following properties: a solids content (approximately 1.5 grams, 30 minutes at 325° F.) of 18%, a specific gravity at 77° F. of 0.950 and a viscosity (Brookfield, 77° F.) of 330–360 centipoises.

A 70% by weight solution of the aromatic petroleum pitch (Resin PR) in the aromatic solvent (xylene) is prepared by heating 1,032 lbs. of the aromatic petroleum pitch to about 250° F. and stirring in the required amount of the aromatic solvent. Some excess of the required amount of the aromatic solvent (1,032 lbs.) for this batch should be prepared to allow for transfer losses. The 70% solution of the aromatic petroleum pitch in the aromatic solvent has the following properties: a solids content (approximately 1.5 grams, 15 minutes at 325° F.) of 70%, a specific gravity at 77° F. of 1.074 and a viscosity (Brookfield, 77° F.) of 240–285 centipoises.

The chlorinated rubber solution is coold to about 77° F. and agitated while first adding thereto the aromatic petroleum pitch solution and then most of the extra aromatic solvent. Since the preferred stabilizer for the chlorinated rubber, i.e., epichlorohydrin, is rather toxic in a concentrated state, it is added just before the final addition of the aromatic solvent.

The 700 gallon primer solution contains 506 gallons (4,005 lbs.) of the chlorinated rubber solution, 114 gallons (1,032 lbs.) of the aromatic petroleum pitch solution, 3 gallons (28 lbs.) of the stabilizer and 77 gallons (570 lbs.) of extra aromatic solvent. Thus, the weight amounts of the materials in a 700 gallon batch of the preferred primer are 721 lbs. (12.8% by weight) of the chlorinated rubber powder, 721 lbs. (12.8% by weight) of the aromatic petroleum pitch, 28 lbs. (0.5% by weight) of the epichlorohydrin stabilizer and 4,165 lbs. (73.9% by weight) of the aromatic solvent (xylene).

The primer is used by applying it to pipe in a conventional manner, such as by spraying a warmed rotating pipe with the primer and thereafter applying a pipe coating to the partially or completely dried prime coated pipe by spraying the hot pipe coating thereon.

The following six tests were run and the results tabulated below in Tables I-IV on steel panels or pipe coated with a representative asphaltic pipe coating, without any primer or with comparative primers or with primers of the invention.

A. SCREENING TESTS

1. Peel Test (Hotline Adhesion) (Table I)

This test was to determine if a strip 3 inch × ¾ inch of coating could be peeled from a primed and coated 6 inch × 6 inch × ⅛inch mild steel flat panel heated at 160° F. for 1 hour (initial determination) and heated at 160° F. for 72 hours (final determination). If the strip broke, rather than peeled loose, the primer had made a strong bond, and the primer passed this test for hotline adhesion.

2. SHORT-TERM CATHODIC DISBONDING TEST (TABLE I)

The test consisted of primed and coated flat cold rolled steel panels 2¾inch×5⅞inch×20 gauge being immersed for 7 days in a synthetic sea water bath of pH 8.0–8.2 at room temperature (R.T.) or at a more severe temperature of 115° F., and charged with -1.5 volts of direct current. Each panel had a 5/32 inch hole drilled through the coating to simulate a break ["holiday"] in the coating system. The amount of undercutting at each holiday was measured in square inches at the end of the test.

3. MECHANICAL BOND TEST (TABLE I)

A simple mechanical bond test was run on all short-term cathodic disbonding flat panels at the end of that test. It was also run on Peel Test flat panels after that test was completed and the panels had cooled to room temperature. The test consisted of forcing a medium size screw driver through the coating and against the metal, and then prying down on the handle. The ease with which chips of coating could be removed from the panels was observed. Other factors were also observed, such as whether the primer came loose at the metal or the coating.

B. OTHER TESTS

4. Long-Term Cathodic Disbonding Test (Table II)

This test was the same test as the short-term cathodic disbonding test in many respects. However, 2 inch size black iron pipes by 2 feet long were used, instead of flat panels, to run this test. Also the synthetic sea water bath was held at 85° F. rather than 115° F. The purpose was the same as the short-term cathodic disbonding test, namely, to measure the area disbonded at the holiday by the conditions of the test. The time of exposure for this long-term cathodic disbonding test was much longer than 7 days, namely, 60 days or more. Each pipe had four holidays drilled through the coating, and three or four pipes were run in each instance.

5. COLD CRACK TEST (TABLE III)

A 12inch ×4 inch ×3/16 inch flat steel panel was coated with primer and 3/32 inch thick layer of pipe coating. It was then cooled for 6 hours at a given temperature ($-10°$ F. or $0°$ F.) and examined visually and with a spark tester. Any cracks or disbonding indicated a failure of the test.

6. IMPACT TEST (TABLE IV)

A steel ball 2 inches in diameter and weighing about 540 grams was dropped from a one foot height on a coated flat panel. The temperature was varied, and the lowest temperature was determined that panels passed the test. A cracked or disbonded coating was a failure.

The representative asphaltic pipe coating which was used in all the tests had the following composition:

| Components | % by Weight |
| --- | --- |
| Solvent extracted asphalt (air blown) having a penetration of 85–100 at 77° F. and a softening point of 232–235° F. | 80 |
| Slate flour (filler) | 20 |
| TOTAL | 100 |

The primers which were used had the following compositions wherein Primers X and Y are comparative primers and Primers A, B and C are primers of the present invention.

TABLE P

| | % by Weight | | | | |
| --- | --- | --- | --- | --- | --- |
| Components/Primer | X | Y | A | B | C |
| Parlon S-20 (chlorinated rubber) | — | — | — | — | 20 |
| Parlon S-300 (chlorinated rubber) | 10 | — | 12.9 | 12.8 | — |
| Resin PR (aromatic petroleum pitch) | — | 50 | 12.9 | 12.8 | 12.5 |
| SC-100 (aromatic solvent) | 90 | 50 | 74.2 | 73.9 | 67.5 |
| Epichlorohydrin | — | — | — | 0.5 | — |
| TOTAL | 100 | 100 | 100 | 100 | 100 |

TABLE I

| | Peel Test | | Mechanical Bond Test | | Short-Term Cathodic Disbonding Test | |
| --- | --- | --- | --- | --- | --- | --- |
| Coated Panel | Initial Determination | Final Determination | Cathodic Disbonding Panel | Peel Panel | (° F.) | (In.$^2$) |
| With Primer X | Pass | Pass | Fair | Fair | R.T. | 0.00 |
| With Primer Y | Pass | Pass | Poor | — | R.T. | 0.02 |
| With Primer A | Pass | Pass | Good | Good | 115 | 0.14 |
| With Primer B | Pass | Pass | Good | Good | R.T. | 0.00 |
| With Primer C | Pass | Pass | Good | Good | R.T. | 0.00 |

TABLE II

| Coated Pipe | Length of Test [Days] | Long-Term Cathodic Disbonding Test (In.$^2$) |
| --- | --- | --- |
| Without Primer | 60 | 14.31 |
| | 120 | 70% of pipe coating |
| With Primer A | 60 | 0.00 |
| | 120 | 0.00[1] |
| | 515 | 0.00[2] |

[1]The Primer A did not disbond. Some undercutting did occur between the Primer A and the coating, however. This was about 1/4" to 1/2" in diameter.
[2]Some separation of Primer A and coating occurred at the holidays (same as 1) which had a diameter of 2/4 in. diameter. Some moisture was found between the Primer A and coating at these points.

TABLE III

| | Cold Crack Test | |
|---|---|---|
| | Samples Passing Test At: | |
| Coated Panel | −10° F. | 0° F. |
| With Primer A | 2 of 2 | 2 of 2 |
| With Primer C | 0 of 1 | 1 of 1 |

TABLE IV

| | Impact Test | | |
|---|---|---|---|
| | Samples Passing Test At: | | |
| Coated Panel | 32° F. | 36° F. | 40° F. |
| With Primer A | 1 of 3 | 0 of 2 | 3 of 3 |
| With Primer C | 6 of 6 | 3 of 3 | |

From the above comparative date in Table I, it is clear that the primers of the invention must contain both the chlorinated rubber (e.g., Parlon S-20 or S-300) and the aromatic petroleum pitch (e.g., Resin PR), since the Primers A, B and C of the invention containing these two dissolved solids gave satisfactory results in all three of the screening tests (peel test, mechanical bond test and short-term cathodic disbonding test) whereas the comparative Primer X containing only the dissolved chlorinated rubber and comparative Primer Y containing only the dissolved aromatic petroleum pitch gave unsatisfactory results in the mechanical bond screening test. Moreover, the comparative data in Table II show that the preferred primer of the invention (Primer A) greatly improved to an unusual degree the long-term cathodic disbonding properties of an asphaltic coated pipe. In addition, the data in Tables III and IV show that the primers of the invention (Primers A and C) impart cold crack resistance and impact resistance to asphaltic coated pipe.

Similar test results may be obtained when the primers of the invention are used with other asphaltic pipe coatings. (See the additional examples below).

Although the primers of the invention are particularly useful with asphaltic coatings for pipe, they can also be used with asphaltic coatings or mastics for structural steel and steel tanks which are subject to atmospheric corrosion.

ADDITIONAL EXAMPLES

A solution (D) of Parlon S-300 chlorinated rubber and Resin PR aromatic petroleum pitch in number 765 solvent (311° F.-344° F. b.r.) weighing a total of 781.2 grams and containing a 4:1 weight ratio of rubber to pitch, was made by the method described for making compositions A, B and C above.

Two steel panels measuring 3 inches by 6 inches by one-half inch thick were sandblasted to form a clean surface, and one was then prime coated with Composition D. The primed panel and the unprimed panel were each finish coated with a curable asphalt-based coating composition denoted Lion Pipecoating No. 2010.

After each panel coating had been cured, and the balance of each panel had been seal coated, each was immersed in an electrolyte bath (fresh water containing 1% each of sodium chloride, sodium carbonate and sodium sulfate) of pH of 10.5 at 130° F., and each was charged with -5 volts of direct current. Each panel had a hole measuring three-eighths of an inch (⅜) in diameter drilled through the coating to simulate a holiday in the coating system. The amount of undercutting at each holiday was measured in square inches ten days later. The results:

| Panel No. | Primer | Radius of Disbonded Area, inches | Disbonded Area, Net of Holiday Area, sq. inch |
|---|---|---|---|
| 1 | No | 0.56 | 0.88 |
| 2 | Yes | 0.31 | 0.19 |

Results from panels 1 and 2 show that ratios of chlorinated rubber to aromatic petroleum pitch greater than 2:1 improve resistance to cathodic disbonding for at least one asphalt-based finish coating.

These results and those set forth in Tables I to IV also suggest that the performance of the compositions of this invention as primers depends on the compatability of the primer coating and the asphalt-based finish coating. Accordingly, the primer compositions of this invention may not perform as well as in these examples with some other asphalt-based finish coatings.

What is claimed is:

1. An article coated with a primer composition and an asphaltic coating, said primer composition being present in an amount sufficient to impart resistance to cathodic disbonding of said asphaltic coating from said article, said primer composition comprising chlorinated rubber, a 20% solution of the chlorinated rubber in toluene having a viscosity of from about 20 to about 300 centipoises at 25° C., and an aromatic petroleum pitch having a softening point of from about 104° F. to about 152° F. and a specific gravity at 60° F. of about 1.17, the weight ratio of chlorinated rubber to aromatic petroleum pitch being from about 0.8 to 1 to about 2 to 1.

2. The article of claim 1 wherein the article is metallic.

3. The article of claim 2 wherein the metallic article is pipe.

4. The metallic pipe of claim 3 wherein the pipe is steel.

5. The article of claim 3 wherein the coated metallic pipe has at least one asphalt-based coating thereover.

6. The article of claim 1 wherein the weight ratio of the chlorinated rubber to aromatic petroleum pitch is about 1:1.

7. A primer composition for imparting resistance to cathodic disbonding of an asphaltic coating from an article coated therewith, said primer composition consisting essentially of at least one chlorinated rubber, a 20% solution of said chlorinated rubber in toluene having a viscosity of from about 20 to about 300 centipoises at 25° C, and at least one aromatic petroleum pitch, the components of the aromatic petroleum pitch being substantially aromatic and being obtained by heat cracking at at least 700° C a member selected from the group consisting of crude petroleum oil, heavy oil, naphtha, asphalt, and mixtures thereof, and distilling off the cracked fractions of 400° C and less, said chlorinated rubber and aromatic petroleum pitch being dissolved in at least one solvent therefor, the weight ratio of chlorinated rubber to aromatic petroleum pitch being at least about 0.8:1.

8. The composition of claim 7 wherein at least one solvent is aromatic, and the aromatic petroleum pitch has a softening point in the range of about 100° F. to about 150° F.

9. A primer for imparting resistance to cathodic disbonding of an asphaltic coating from a substrate coated therewith, said primer comprising a solution of (a) from about 8% to about 20% by weight of a chlorinated rubber, a 20% solution of the chlorinated rubber in toluene having a viscosity of from about 20 to about 300 centipoises at 25° C.;

(b) from about 4% to about 25% by weight of an aromatic petroleum pitch having a softening point of from about 104° F. to about 152° F. and a specific gravity at 60° F. of about 1.17; and (c) from about 55% to about 88% by weight of an aromatic solvent for the chlorinated rubber and the aromatic petroleum pitch;

the weight ratio of component (a) to component (b) being from about 0.8:1 to about 2:1.

10. The primer as defined by claim 9 wherein the weight ratio of component (a) to component (b) is about 1:1.

11. The primer as defined by claim 9 wherein the aromatic solvent is xylene.

12. The primer as defined by claim 9 wherein the aromatic solvent is an aromatic naptha solvent having a boiling range of from about 311° F. to about 344° F.

13. The primer as defined by claim 9 which further comprises (d) from about 0.3% to about 0.8% by weight of a storage stabilizer for the chlorinated rubber.

14. The primer as defined by claim 13 wherein the stabilizer is epichlorohydrin.

15. A primer for imparting resistance to cathodic disbonding of an asphaltic pipe coating from a pipe coated therewith, said primer comprising a solution of (a) about 13% by weight of a chlorinated rubber, a 20% solution of the chlorinated rubber in toluene having a viscosity of about 300 centipoises at 25° C.;

(b) about 13% by weight of an aromatic petroleum pitch having a softening point of from about 115° F. to about 135° F. and a specific gravity at 60° F. of about 1.17; and (c) about 74% by weight of an aromatic solvent for the chlorinated rubber and the aromatic petroleum pitch.

16. The primer as defined by claim 15 wherein the aromatic solvent is xylene.

17. The primer as defined by claim 15 wherein the aromatic solvent is an aromatic naphtha solvent having a boiling range of from about 311° F. to about 344° F.

18. The primer as defined by claim 15 which further comprises (d) about 0.5% by weight of a storage stabilizer for the chlorinated rubber.

19. The primer as defined by claim 18 wherein the stabilizer is epichlorohydrin.

20. A method for imparting resistance to cathodic disbonding of an asphalt coating from a substrate coated therewith which comprises coating said substrate, prior to coating said substrate with said asphaltic coating, with a primer composition consisting essentially of at least one chlorinated rubber, a 20% solution of said chlorinated rubber in toluene having a viscosity of from about 20 to about 300 centipoises at 25° C, and at least one aromatic petroleum pitch, the components of the aromatic petroleum pitch being substantially aromatic and being obtained by heat cracking at at least 700° C a member selected from the group consisting of crude petroleum oil, heavy oil, naphtha, asphalt, and mixtures thereof, and distilling off the cracked fractions of 400° C and less, said chlorinated rubber and aromatic petroleum pitch being dissolved in at last one solvent therefor, the weight ratio of chlorinated rubber to aromatic petroleum pitch being at least about 0.8:1.

21. The method according to claim 20 wherein the aromatic petroleum pitch has a softening point in the range of about 100° F to about 150° F.

22. The method according to claim 20 wherein the solvent for the aromatic petroleum pitch and chlorinated rubber is aromatic.

23. The method according to claim 22 wherein the aromatic solvent is xylene.

24. The method according to claim 22 wherein the aromatic solvent is an aromatic naphtha solvent having a boiling range of from 311° F to about 344° F.

25. The method according to claim 20 wherein the substrate is metallic.

26. The method according to claim 25 wherein the metallic substrate is a pipe.

* * * * *

UNITED STATES PATENT OFFICE
CERTIFICATE OF CORRECTION

Patent No. 4,133,352  Dated January 9, 1979

Inventor(s) Russell E. Koons

It is certified that error appears in the above-identified patent and that said Letters Patent are hereby corrected as shown below:

Title page, Assignee:, change "Lion Oil Company" to
-- Tosco Corporation --. Column 3, line 56, after the word rubber delete "agent". Column 4, line 57, change "coold" to -- cooled --. Column 10, line 25, change "last" to
-- least --.

Signed and Sealed this

Twenty-second Day of May 1979

[SEAL]

Attest:

RUTH C. MASON
Attesting Officer

DONALD W. BANNER
Commissioner of Patents and Trademarks